(12) United States Patent
Taru et al.

(10) Patent No.: US 6,810,692 B2
(45) Date of Patent: Nov. 2, 2004

(54) METHOD OF CONTROLLING AN UPPER PORTION OF AN OPTICAL FIBER DRAW FURNACE

(75) Inventors: Toshiki Taru, Yokohama (JP); Katsuya Nagayama, Yokohama (JP); Kazuya Kuwahara, Yokohama (JP); Ichiro Tsuchiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/445,814

(22) Filed: May 28, 2003

(65) Prior Publication Data

US 2003/0205068 A1 Nov. 6, 2003

Related U.S. Application Data

(63) Continuation of application No. 09/622,827, filed as application No. PCT/JP99/01636 on Mar. 29, 1999, now Pat. No. 6,668,592.

(30) Foreign Application Priority Data

| Apr. 3, 1998 | (JP) | 10-90520 |
| Aug. 4, 1998 | (JP) | 10-219515 |
| Sep. 11, 1998 | (JP) | 10-257683 |

(51) Int. Cl.$^7$ .......................................... C03B 37/027
(52) U.S. Cl. ............................... 65/435; 65/540
(58) Field of Search .................... 65/435, 540

(56) References Cited

U.S. PATENT DOCUMENTS

| 4,030,901 A | 6/1977 | Kaiser |
| 4,309,201 A | 1/1982 | Klop et al. |
| 4,477,274 A | 10/1984 | Janssen et al. |
| 5,931,984 A | 8/1999 | Drouart et al. |
| 6,138,481 A | 10/2000 | Saito et al. |
| 6,192,715 B1 | 2/2001 | Orita et al. |

FOREIGN PATENT DOCUMENTS

| JP | 2-6348 | 1/1990 |
| JP | 02006349 A | 1/1990 |
| JP | 3-126634 | 5/1991 |
| JP | 5-147969 | 6/1993 |
| JP | 6-199536 | 7/1994 |
| JP | 6-199537 | 7/1994 |
| JP | 61-20493 | 5/1996 |
| JP | 9-2832 | 1/1997 |
| JP | 11-79777 | 3/1999 |

Primary Examiner—John Hoffmann
(74) Attorney, Agent, or Firm—McDermott Will & Emery LLP

(57) ABSTRACT

A furnace for drawing an optical fiber provided with a muffle tube (10) and inner tubes (5,5') connected to the upper end of the core tube, wherein a preform (1) supported by a dummy rod (2) at the upper part thereof is disposed inside the muffle tube (10) and inner tubes (5,5') so as to be movable downward together with dummy rod (2), the preform (1) is heated and melted by a heater (11) from the outside of the muffle tube (10) and an optical fiber (1a) is pulled out from the lower end of the preform (1); the furnace is further provided with one or a plurality of sets of separating plates (4, 17) adapted to partition a space in the inner tubes (5,5') above the preform (1) into a plurality of portions in the advance direction of the preform and disposed in the space, and with gas blowing inlets (8) disposed in the parts of wall surfaces of the inner tubes (5,5') which are below the separating plates (4, 17) and adapted to blow an inert gas into the inner tubes (5,5') and the muffle tube (10), thereby preventing variations in diameter of the optical fiber (1a).

2 Claims, 10 Drawing Sheets

METHOD OF CONTROLLING AN UPPER PORTION OF AN OPTICAL FIBER DRAW FURNACE

This application is a continuation of 09/622,827, filed Aug. 24, 2000, and now U.S. Pat. No. 6,668,592, which is a 371 of PCT/JP99/01636 filed Mar. 29, 1999.

TECHNICAL FIELD

The present invention relates to a furnace and a method for drawing an optical fiber from heated and molten preform.

BACKGROUND ART

Various techniques have been known relating to a furnace for drawing an optical fiber from heated preform formed with silica glass as a main component, and they are described in Japanese Patent No. 2,542,679, Japanese Patent Laid-Open No. 147969/1993 and Japanese Patent Laid-Open No. 2832/1997. Since the figures and terminology in these prior arts differ partially from those used in this invention, descriptions will be made below where they are interpreted according to the figures and terminology used in this invention in order to clarify the difference between the prior arts and this invention.

A main part of the furnace for drawing an optical fiber disclosed in Japanese Patent No. 2,542,679 is shown in FIG. 8, in which numeral 21 denotes a preform, 21a denotes an optical fiber, 22 denotes an inner tube, 22a denotes a gas blowing inlet, 23 denotes an outer tube, 24 denotes a gas supplying inlet, 24a denotes a gas passage, 25 denotes a dummy rod, 25a denotes a connecting part, 26 denotes a retainer, 27 denotes a seal piston, 28 denotes a muffle tube, and 29 denotes a heater.

In the furnace for drawing an optical fiber, the dummy rod 25 and the preform 21 are arranged inside the muffle tube 28 and the inner tube 22 arranged to be connected to an upper end of the muffle tube 28, while they are connected via the connecting part 25a and are descended together. The vicinity of a lower end of the preform 21 is melted through heating by the heater 29 arranged outside the muffle tube 28, and the optical fiber 21a is drawn downward from the lower end of the preform 21. The inner tube 22 arranged to be connected to the upper end of the muffle tube 28 is to contain the long preform 21 on starting the drawing.

The gas passage 24a is formed between the inner tube 22 and the outer tube 23 arranged outside the same, and an inert gas is supplied from the gas supplying inlet 24 to the gas passage 24a, so as to blow the inert gas into the inside of the inner tube 22 from the numerous gas blowing inlets 22a provided circumferentially and in the height direction on the wall surface of the inner tube 22. The inert gas is flowed inside the inner tube 22 and the muffle tube 28 to prevent oxidation deterioration of the muffle tube and the like, and when the temperature distribution of the inert gas by heating and the flow of the inert as are not uniform, the fluctuation of the diameter of the optical fiber drawn from the preform is liable to occur.

Therefore, in this example of the furnace for drawing an optical fiber, the seal piston 27 connected to the dummy rod 25 via the retainer 26 and moved with the dummy rod 25 is provided at the dummy rod 25 arranged on the upper part of the preform 21. In the beginning of drawing, the dummy rod 25 and the seal piston 27 are in the upper part because the preform is long. With proceeding the drawing, the preform 21 is shortened from the lower end, and is descended, and thus, the dummy rod 25 and the seal piston 27 are also descended.

In this case, if the seal piston 27 were not present, the space between the dummy rod 25 and the inner tube 22 would gradually increase, but because the seal piston 27 is present, the volume of space above the preform 21 is substantially constant. Therefore, it has been said that turbulence of the stream of the inert gas in the space between the preform 21 and the seal piston 27 occurs only scarcely due to the provision of the seal piston 27.

In the furnace using the seal piston for drawing an optical fiber, when the preform has a length of 1.5 m or more, the seal piston necessarily has an proportionate length, and the weight thereof becomes also heavy. Because a supporting member for supporting them at the upper part must withstand the weight of the preform and the seal piston, the supporting member becomes also necessarily large. Because the seal piston must resist to high temperature, a heat resistant material, such as carbon, quartz and the like, is necessarily used for the seal piston, and it becomes costly when it is of large scale.

Furthermore, because the seal piston moves as sliding on the inner wall surface of the inner tube, dust is liable to come from the sliding part, which may adversely affect the strength of the drawn optical fiber.

Furthermore, as the seal piston descents, the numerous gas blowing inlets provided in the wall surface of the inner tube are sealed one by one from the upper part with the seal piston, a precise controller for continuously controlling the gas flow rate is necessary to maintain the constant flow rate of the stream of the inert gas.

A furnace for drawing an optical fiber disclosed in Japanese Patent Laid-Open No. 147969/1993 will then be described. A main part of the furnace for drawing an optical fiber is shown in FIG. 9. In FIG. 9, the same references as in FIG. 8 show the same components. Numeral 30 denotes a separating plate, 30a denotes a gap, 30b denotes pores, 31a denotes an upper space, 31b denotes a lower space, and 32 denotes an upper lid. The furnace for drawing an optical fiber shown in FIG. 9 is different from that shown in FIG. 8 in the following points. There is no member corresponding to the seal piston in FIG. 8, and an upper end of an inner tube 22 is closed with the upper lid 32 except for the part through which a dummy rod 25 penetrates.

In the furnace for drawing an optical fiber, a preform 21 is arranged inside a muffle tube 28 and the inner tube 22 connected to an upper end thereof, and the preform 21 is supported by hanging by the dummy rod 25 through a connecting part 25a. The vicinity of the lower end of the preform 21 is heated and melted by a heater 29 arranged outside the muffle tube 28, and an optical fiber 21a is drawn downward.

An outer tube 23 is arranged concentrically outside the inner tube 22, and an inert gas is blown into the inside of the inner tube via a gas blowing inlet 22a through a gas passage 24a formed with the outer tube 23 and the inner tube 22. The inert gas is introduced to the gas passage 24a from a gas supplying inlet 24. The inert gas blown into the inner tube 22 descends through the space between (the inner tube 22 and the muffle tube 28) and (the preform 21 or the dummy rod 25), then it is exhausted through the vicinity of the optical fiber 21a.

The space inside the inner tube 22 is separated by the separating plate 30 comprising a quartz plate or the like into an upper part and a lower part, and the inert gas flows from the upper space 31a of the separating plate 30 to the lower space 31b through the gap 30a between the separating plate 30 and the inner tube 22 or the pores 30b provided in the separating plate 30. Because the lower space 31b is of a relatively high temperature and turbulence of the gas stream is decreased owing to the presence of the separating plate 30, it has been said that an optical fiber having a small fluctuation in diameter can be drawn even in the case of a large preform.

However, in the case of this furnace for drawing an optical fiber, when the preform 21 becomes small with proceeding the drawing, the upper space 31a becomes large. On the other hand, the temperature near the upper end of the preform 21 is increased by heating the vicinity of the lower end of the preform 21, and said temperature becomes higher when the preform becomes small. Because of the presence of the separating plate 30 comprising a quartz plate, the temperature is somewhat decreased above the separating plate, but it becomes 550° C. or more near the lower end of the upper space 31a. At this time, the temperature near the upper end of the upper space 31a is about 200° C. to form a considerable difference in temperature between the upper part and the lower part inside the upper space 31a, therefore convection is liable to be caused. The convection causes fluctuation in volume of the inert gas, and the fluctuation is transmitted to the lower space 31b by the flow of the inert gas through the gap 30a or the pore 30b of the separating plate 30. Thus, fluctuation in flow of the inert gas near the optical fiber occurs. As a result, the amount of heat transmission is changed by the fluctuation of the inert gas to easily cause fluctuation in viscosity and softened amount of glass, and thus it is difficult to suppress fluctuation in fiber diameter to a small value less than the prescribed value.

A furnace for drawing an optical fiber disclosed in Japanese Patent Laid-Open No. 2832/1997 will then be described. The furnace for drawing an optical fiber is shown in FIG. 10. In FIG. 10, the corresponding references as in FIG. 8 show the same components. Numeral 33 denotes an upper space above the preform, and 34 denotes an auxiliary heater. In the furnace for drawing an optical fiber, a preform 21 is arranged inside a muffle tube 28 and the inner tube 22 connected to an upper end thereof, being supported by hanging by the dummy rod 25, and the vicinity of a lower end of the preform 21 is heated and melted by a heater 29 arranged outside the muffle tube 28, so as to draw an optical fiber 21a downward.

An outer tube 23 is arranged outside the inner tube 22 concentrically, and an inert gas is blown into the inside of the inner tube via a gas blowing inlet 22a through a gas passage 24a formed with the outer tube 23 and the inner tube 22. Because the vicinity of the upper end of the preform 21 becomes a high temperature of 1,000° C. or more by heating the vicinity of the lower end of the preform 21, a large temperature difference formed between the upper part and the lower part of the space 33 above the preform.

In order to decrease the temperature difference, the auxiliary heater 34 is arranged outside the upper end of the inner tube 22 to heat the vicinity of the upper end of the inner tube 22. Thus, the vertical temperature difference of the space 33 between the inner tube 22 and the dummy rod 25 above the preform is decreased by the heating by the auxiliary heater 34 to prevent the convection from occurring at the space 33, and fluctuation in diameter of the optical fiber 21a drawn from the preform 21 is decreased.

However, in the case of this furnace for drawing an optical fiber, because the space 33 above the preform becomes large as the drawing of a large scale preform proceeds, it is difficult to make the temperature uniform inside the space solely by an auxiliary heater 34 arranged outside the upper part of the inner tube 22.

It is then considered that several auxiliary heaters are arranged vertically not only at the upper part but also at the lower part of the inner tube, and by controlling the temperature of each auxiliary heater, the temperature of the space above the preform is made uniform. However, there are problems that cost of the apparatus becomes increased, and the temperature control becomes complicated.

DISCLOSURE OF INVENTION

The invention is to provide a furnace for drawing an optical fiber and a method for drawing an optical fiber to solve the problems associated with the conventional art described in the foregoing.

The furnace for drawing an optical fiber according to the invention comprises a muffle tube and an inner tube connected to an end of the muffle tube. The preform is arranged inside the muffle tube and the inner tube and supported by a dummy rod at an upper part thereof in such a manner that the preform descends with the dummy rod. The preform is heated from outside of the muffle tube by a heater, and melted so as to draw an optical fiber from a lower end of the preform. One set or plural sets of separating plates separating a space inside the inner tube above the preform into plural parts in an advancing direction of the preform are arranged inside the space, and a gas blowing inlet for blowing an inert gas into the inner tube and the muffle tube is provided at the wall of the inner tube at a part under the separating plates.

Therefore, the inert gas entered from the gas blowing inlet mainly flows downward, and thus the gas in the upper space of the separating plate above the preform less influences the conditions of the drawing of the preform. Accordingly, the drawing is stably continued, and fluctuation in fiber diameter is decreased. Therefore, an optical fiber produced by using this furnace for drawing an optical fiber has a substantially constant outer diameter in the longitudinal direction, and has small fluctuation in transmission characteristics. Owing to the use of a simple separating plate but not using a large member such as a seal piston, the cost of the apparatus is low, and since heavy sliding as in the seal piston does not occur, dust formed by sliding is so minimal that it doesn't adversely affect the strength of the optical fiber.

While the separating plates comprise plural sets of separating plates arranged as being penetrated by the dummy rod, and the plural sets of separating plates descend with the descent of the dummy rod, the respective sets of the plural sets of separating plates are stopped on the inner wall surface of the inner tube one by one, so that the space inside the inner tube above the preform is respectively separated into an upper part and a lower part by the stopped separating plates. Thus, because the space inside the inner tube can be separated by plural positions into suitable sizes, the flow of the inert gas inside the inner tube can be further stabilized even when the preform becomes small and the space inside the inner tube is enlarged with proceeding the drawing of the optical fiber.

While the respective sets of separating plates may each comprise one disk-shaped plate, the sets of separating plates may each be constituted by two plate members of an outer member and an inner member. In this case, the outer member has an outer diameter that is the same as the inner diameter of the inner tube at a position where the separating plate is stopped, and has a center hole diameter that is larger than the outer diameter of dummy rod so as to absorb the deviation from the concentric condition of the inner tube and the dummy rod. The inner member has an outer diameter that is larger than the center hole diameter of the outer member and smaller than the outer diameter of the outer member, and has a center hole diameter larger than an outer diameter of the dummy rod by 2 to 10 mm.

When the dummy rod penetrates both the members with the inner member being placed at upper side and the outer member being placed at lower side, the upward inner member is supported by being placed on the outer member. By constituting each of the sets of separating plates of an outer member and an inner member, even when the concentric condition of the inner tube and the dummy rod is deviated by rolling of the preform to cause decentering, the upper member moves in the radial direction by sliding on the lower member, and no such phenomenon that the inner wall surface of the inner tube is damaged by the separating plate occurs.

Alternatively, one or plural sets of separating plates may be arranged near the lower end of the dummy rod or at the upper part of the preform by fixing to the dummy rod, the connecting part or the preform, and they descend with the descent of the preform without stopping on the way on the inner wall of the inner tube. Accordingly, the space between the separating plates and the preform can be unchanged and constant even when the preform is shortened, and thus the flow of the gas in the space above the preform can be stabilized. It is also possible in this case that the respective sets of separating plates are each constituted by an outer member and an inner member. In this case, however, the outer diameter of the outer member must be smaller than the inner diameter of the inner tube by 5 to 10 mm, and the center hole diameter of the outer member must be larger than the outer diameter of the dummy rod. The outer diameter of the inner member must be larger than the center hole diameter of the outer member but smaller than the outer diameter of the outer member. The center hole diameter of the inner member must be the same as or larger than the outer diameter of the dummy rod. The inner member is then supported by the dummy rod or the connecting part with the inner member being downward and the outer member being upward.

By constituting each of the respective sets of separating plates by the outer member and the inner member, even in the case where the concentric condition is deviated by rolling of the preform to cause decentering, the upper member moves in the radial direction by sliding on the lower member, and no such phenomenon that the inner wall surface of the inner tube is damaged by the separating plate occurs.

When plural protrusions are provided on an outer periphery of the separating plate, the sliding friction coefficient of the separating plate to the inner wall surface of the inner tube on descending can be reduced, so as not to damage the inner tube, because only the protrusions are in contact with the inner wall surface of the inner tube.

By forming the separating plate with a heat insulating material, heat transferred from the upper end of the heated preform to the upper space above the separating plate can be reduced, and thus the temperature of the upper space above the separating plate can be reduced. Therefore, the temperature difference between the upper part and the lower part in the upper space is also reduced, and the generation of convection of the inert gas due to the temperature difference can also be suppressed. As a result, the influence on fluctuation in gas flow near the lower part of the preform influenced by the convection of the inert gas in the upper space can be suppressed, and thereby fluctuation in heat transfer amount by the inert gas, and fluctuation in viscosity and softened amount of the glass are suppressed, so as to reduce fluctuation in diameter of the optical fiber. Furthermore, because the influence by the convection of the inert gas in the upper space is reduced, the inert gas atmosphere can be maintained and the fluctuation in fiber diameter can be suppressed by flowing only a small amount of the inert gas near the preform. Therefore, the amount of consumption of high cost inert gas, such as helium, is reduced, and thus an economical effect is also expected.

Furthermore, by arranging an auxiliary heater outside the vicinity of the upper end of the inner tube to heat the vicinity of the upper part of the inner tube, the temperature inside the upper space can be further uniform.

BEST MODE FOR CARRYING OUT THE INVENTION

Embodiments of the furnace and the method for drawing an optical fiber according to the invention will be described with reference to FIGS. 1 to 7.

Figure 1:
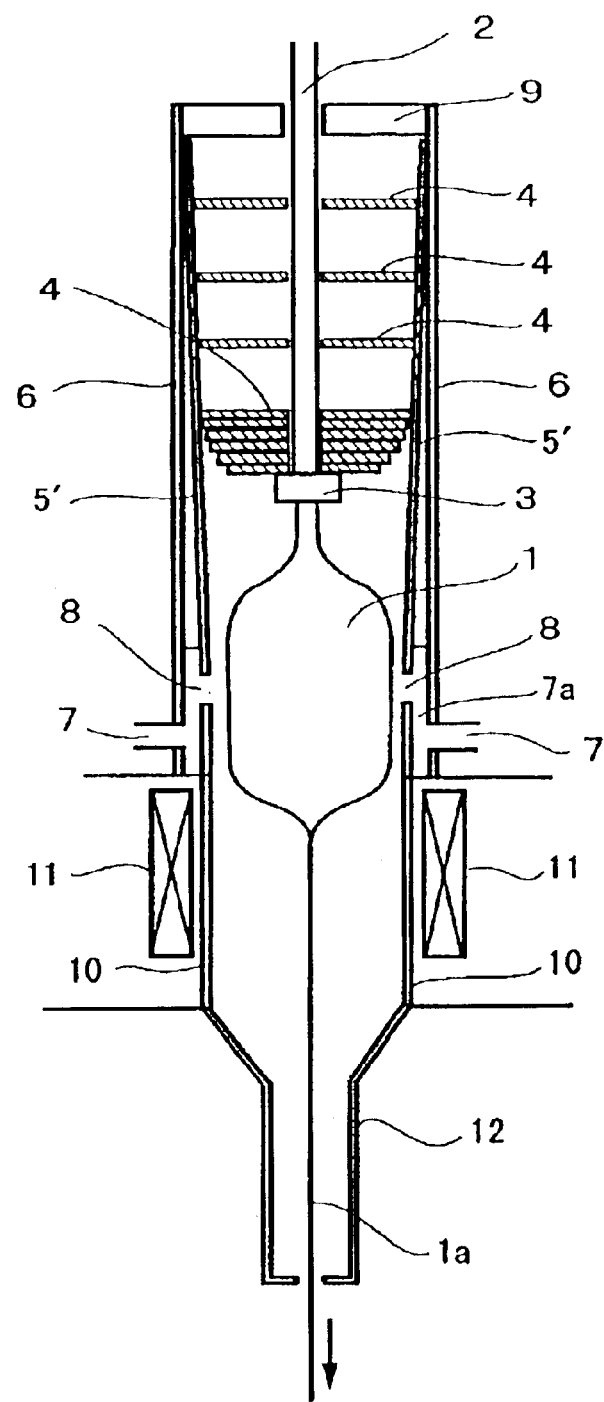
FIG. 1 is a vertical cross sectional view showing a main part of an embodiment of the furnace for drawing an optical fiber according to the invention.
Figure 2A:
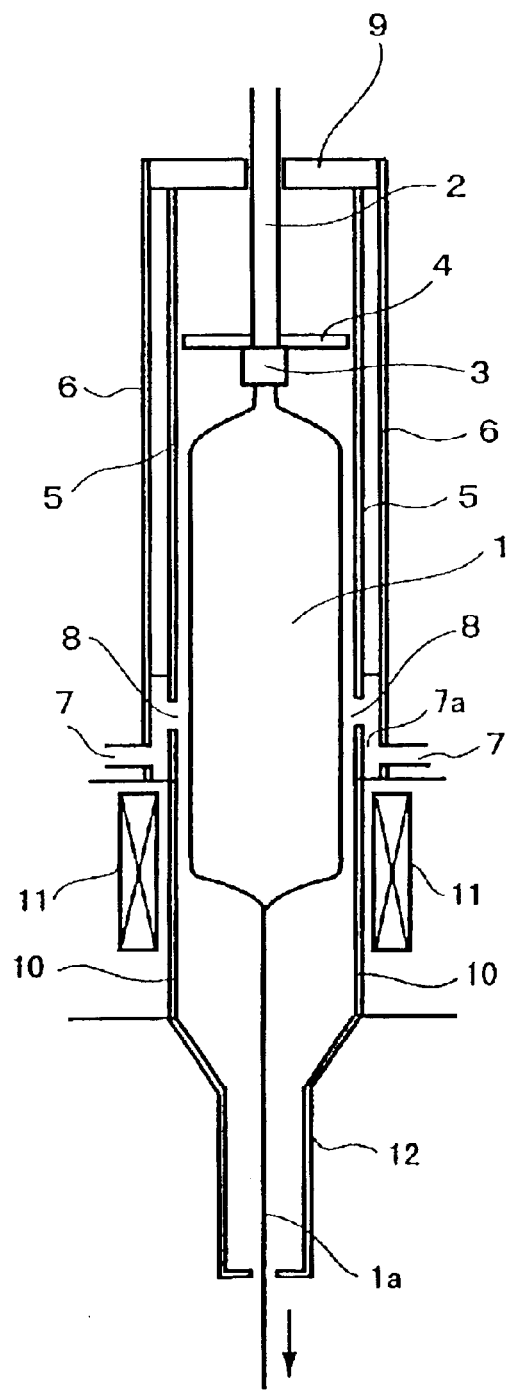
FIG. 2 is vertical cross sectional views showing a main part of another embodiment of the furnace for drawing an optical fiber according to the invention, where (A) is a figure showing the state at the beginning of fiber drawing, and (B) is a figure showing the state near the completion of the fiber drawing.
Figure 2B:
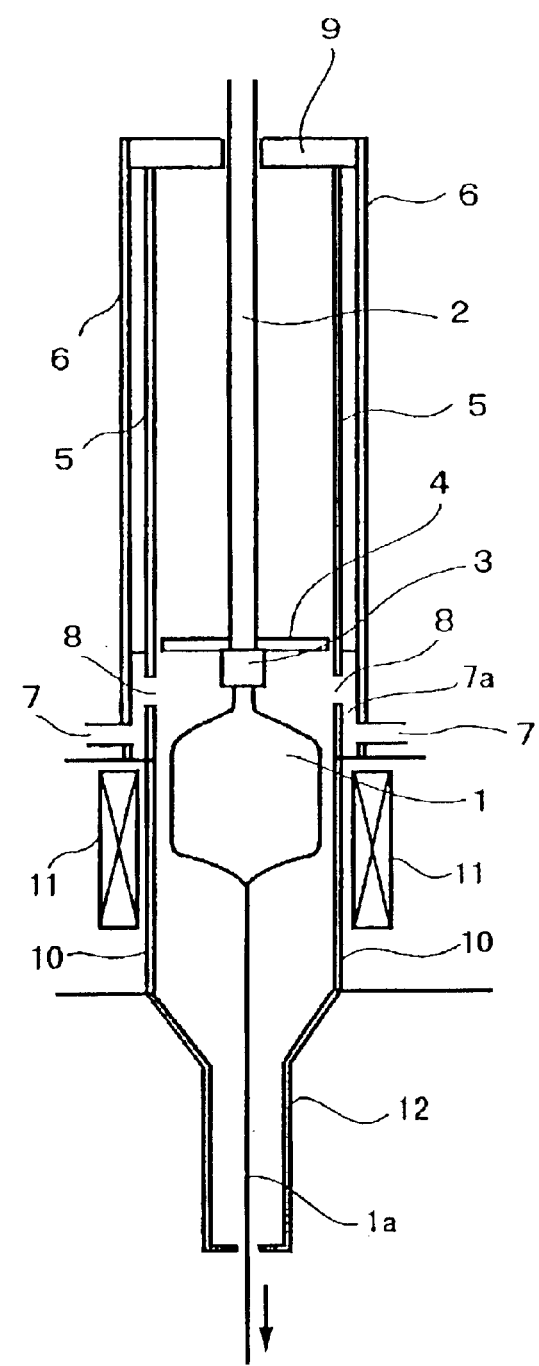

FIGS. 1 and 2 are vertical cross sectional views showing main parts of embodiments of the furnace for drawing an optical fiber of the invention. FIG. 1 shows an embodiment using plural separating plates, and FIG. 2 shows an embodiment using one set of separating plates. FIG. 2(A) shows the state at the beginning of fiber drawing where the preform is large, and FIG. 2(B) shows the state before the completion of fiber drawing where the preform has become small. In FIGS. 1 and 2, numeral 1 denotes a preform, 1a denotes an optical fiber, 2 denotes a dummy rod, 3 denotes a connecting part, 4 denotes a separating plate, 5 and 5' denote an inner tube, 6 denotes an outer tube, 7 denotes a gas supplying inlet, 7a denotes a gas passage, 8 denotes a gas blowing inlet, 9 denotes an upper lid, 10 denotes a muffle tube, 11 denotes a heater, and 12 denotes a casing for downward extension of a furnace body.

In the case of FIGS. 1 and 2, the inner tube 5 or 5' is arranged to connect to an upper end of the muffle tube 10. Most of the muffle tube 10 and the inner tube 5 generally have a cylindrical shape. In the case of FIG. 1, the inner tube 5' has a truncated cone shape where the inner diameter thereof is gradually decreased from the upper part to the lower part. The preform 1 supported by the dummy rod 2 is arranged inside the muffle tube 10 and the inner tube 5 and 5', and the vicinity of the lower end of the preform 1 is heated and melted by the heater 11 from the outside of the muffle tube 10, so as to draw the optical fiber 1a from the lower end of the preform 1.

The outer tube 6 is provided outside the inner tube 5 and 5', and an inert gas is carried into the inside of the inner tube 5 and 5' and the muffle tube 10 from the gas blowing inlet 8 provided on the wall of the inner tube 5 and 5' through the gas supplying inlet 7 provided in the outer tube 6 to the gas passage 7a. The upper end of the inner tube 5 and 5' is covered with an upper lid having a hole, through which the dummy rod 2 penetrates, to prevent the inert gas from exhausting.

A large number of positions, i.e., 10 or more, of the gas blowing inlets 8 provided in the inner tube 5 and 5' are provided on the wall near the lower end of the inner tube 5 and 5' with substantially constant intervals, and the flow of the inert gas blown therefrom in the inner tube 5 and 5' is made as uniform as possible circumferentially. About four gas supplying inlets 7 are provided in the outer tube 6 circumferentially.

Each set of separating plates 4 is in a plate form having a thickness of from several millimeters to about 10 mm comprising a heat resistant material, such as quartz, carbon, silicon carbide and the like, and in the case where the inner tube has a cylindrical shape, it is of a disk shape, and in the case where the inner tube has a prismatic tube shape, it is of a polygonal shape corresponding to the shape of the inner wall thereof. The center hole diameter of each set of the separating plates is made larger than the outer diameter of the dummy rod 2 so as to absorb the deviation from the concentric condition of the inner tube and the dummy rod, and the center hole diameter is made smaller than the size of the connecting-part 3 of the dummy rod 2 and the preform 1, so as to place the separating plate 4 on the connecting part 3.

In the case of FIG. 1, the outer diameters of the respective plural sets of separating plates 4 are gradually decreased one by one from the upper ones to the lower part corresponding to the inner diameters of the inner tube 5' having a truncated cone shape at the positions descending at substantially regular intervals from the upper end of the inner tube 5'. When the preform 1 becomes small with proceeding the drawing, the connecting part 3 descends with the dummy rod 2, but the plural separating plates are stopped at substantially regular intervals on the inner wall surface of the inner tube one set by one set from the separating plate at the upper part, because the plural separating plates 4 are prevented from descending at the position where the inner diameter of the inner tube 5' coincides with the outer diameter of the separating plate 4.

In the example of FIG. 1, the plural sets of separating plates are stopped at intervals on the inner wall surface of the inner tube by using a truncated cone shape inner tube 5' and using the plural sets of separating plates having outer diameters gradually decreasing from the upper part to the lower part, but it is possible to employ another method as a stopping method of the plural sets of separating plates. For example, by using disks having an outer diameter smaller than the inner diameter of the inner tube as the plural sets of separating plates, about 2 to 4 protrusions are provided on the outer circumference of the respective disks circumferentially at regular intervals, and the outer diameter connecting tips of the protrusions is made smaller than the inner diameter of the inner tube by 5 to 10 mm. The plural sets of separating plates are stacked on each other in such a manner that the protrusions do not overlap. On the other hand, protrusion receiving parts are fixed on the inner wall of the inner tube at regular intervals in the axial direction and circumferentially of the inner tube. The circumferential intervals of the protrusion receiving parts coincide with the intervals of the protrusions of the separating plate. The circumferential positions of the protrusion receiving parts are shifted by respective steps in the axial direction of the inner tube. By constituting the inner tube and the separating plates in the manner described above, the separating plates that are placed on a supporting member of the dummy rod in a stacked form in the initial stage descend with the dummy rod and are prevented from descending one set by one set from the upper part by stopping the protrusions on the outer periphery of the separating plate with the protrusion receiving parts on the inner wall surface of the inner tube, and thus the space inside the inner tube can be separated at regular intervals. In this method, however, there is a problem of positional alignment of the protrusions of the separating plate and the protrusion receiving parts of the inner wall surface of the inner tube, and the like, and thus the method of FIG. 1 can be easily handled in view of apparatus.

FIG. 2 shows an embodiment using one set of separating plates. In this case, the separating plate 4 is one plate having a disk form, and placed on the connecting part 3 of the dummy rod 2. The outer diameter of the separating plate 4 is smaller than the inner diameter of the inner tube 5 by about from 5 to 10 mm. It is also possible that the separating plate 4 is not placed on the connecting part 3, but a supporting member is fixed to the dummy rod 2, and the separating plate 4 is placed thereon, or it is directly fixed to the dummy rod 2. Furthermore, by providing gap between the separating plate 4 and the dummy rod 2, the separating plate 4 is prevented from damaging the inner tube 5 even when the dummy rod 2 and the preform 1 roll inside the inner tube 5. Since one set of separating plates has a function of separating the space above the preform in the inner tube, an effect of stabilizing the stream of the inert gas inside the inner tube is obtained. It is more preferable to use plural sets of separating plates to reduce turbulence of the stream of the inert gas inside the space of the inner tube, from the standpoint of reducing the influence on fluctuation in diameter of the optical fiber on drawing, because the length of the inner tube becomes 2 m or more.

Figure 3:
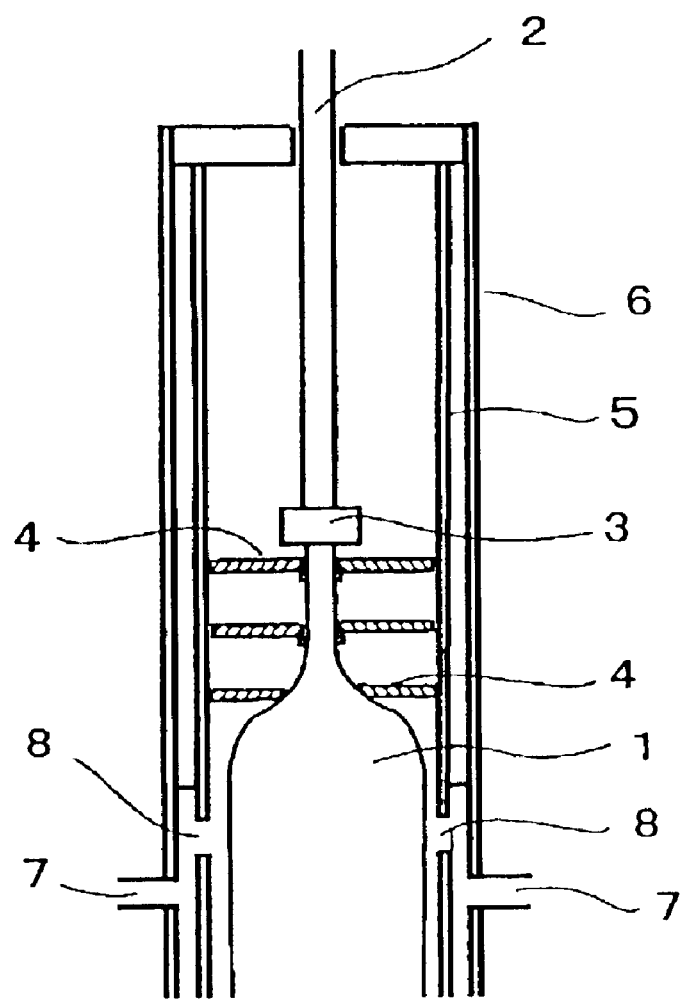
FIG. 3 is an explanatory view of an example where a separating plate is provided between a connecting part and a preform.

A large space occasionally forms between the connecting part and the preform depending on the shape of the preform. In this case, as shown in FIG. 3, the separating plates 4 are arranged at regular intervals between the preform 1 and the connecting part 3, and in the tapered part at an upper part of the preform 1, and thus the space above the preform inside the inner tube can be separated into small parts to further increase the separating effect.

Figure 4A:
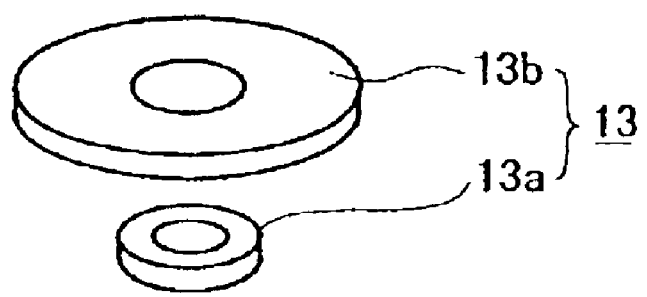
FIG. 4 shows another embodiment of the separating plates according to the invention, where (A) is a perspective view thereof, and (B) is a vertical cross sectional view showing the same near the part where the separating plates are attached.
Figure 4B:
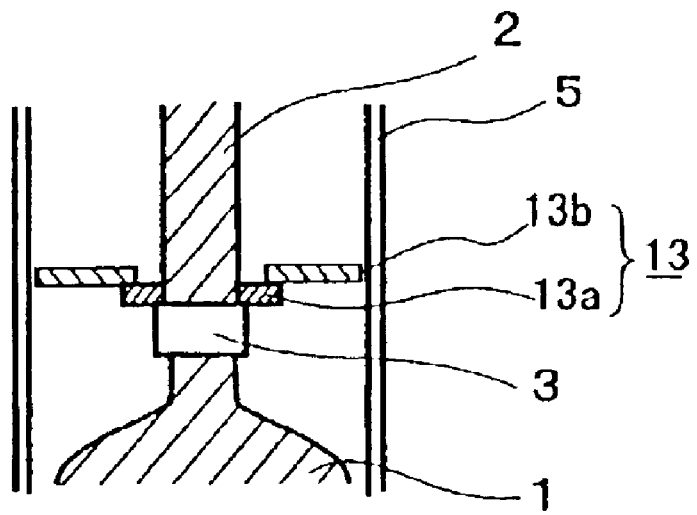
Figure 5A:
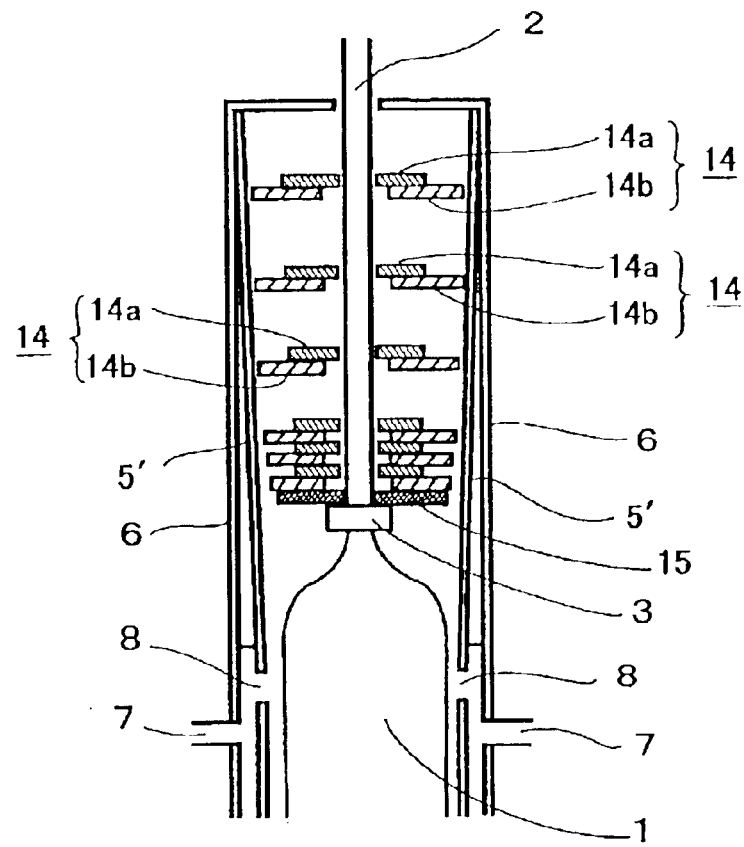
FIG. 5(A) is a vertical cross sectional view showing another embodiment of the separating plates according to the invention.
Figure 5B:
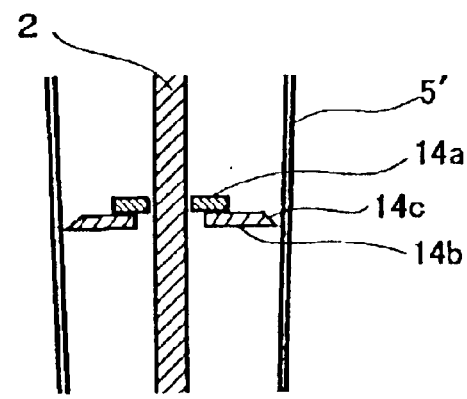
FIG. 5(B) is a detailed cross sectional view of one set of separating plates.

Further embodiments of the separating plate 4 include those shown in FIGS. 4 and 5. FIG. 4(A) is a perspective view of one set of separating plates, and FIG. 4(B) is a vertical cross sectional view showing the state where one set of separating plates is arranged inside the inner tube. FIG. 5(A) is a vertical cross sectional view showing the state where plural sets of separating plates are arranged, and FIG. 5(B) is a detailed cross sectional view of one set of separating plates. In these examples, the set of separating plates 13 or 14 is constituted by an inner member 13a or 14a and an outer member 13b or 14b. The materials are the same as the cases of FIGS. 1 and 2. The outer diameter of the outer member 13b and 14b is smaller than the inner diameter of the inner tube 5 or is the same as the inner diameter of the inner tube 5' at the position where the outer member is stopped, and the center hole diameter of the outer member 13b and 14b is larger than the outer diameter of the dummy rod 2 so as to absorb the deviation from the concentric condition of the inner tube and the dummy rod. The outer diameter of the inner member 13a and 14a is larger than the center hole diameter of the outer member 13b and 14b and is smaller than the outer diameter of the outer member 13b and 14b. The center hole diameter of the inner member 13a and 14a is slightly larger than the outer diameter of the dummy rod 2. In the example of FIG. 4(B), the inner member 13a of one set of separating plates 13 is placed on the connecting part 3, and the outer member 13b is placed on the inner member 13a. Consequently, even when the dummy rod 2 rolls to the right and left inside the inner tube 5 to break the concentric condition, the separating plate 13 can be prevented from damaging the inner tube 5, because the outer member 13b follows by sliding on the inner member 13a.

While FIG. 4 shows an example where both the outer member and the inner member are of a disk shape, in the case where the inner tube has a prismatic tuber shape, at least the outer peripheral shape of the outer member necessarily has a polygonal shape. With respect to the outer diameter and the inner diameter, they can be considered as distances to the outer circumference and the inner circumference measured from the center in the same direction.

The example of FIG. 5(A) shows an embodiment where the respective sets of separating plates 14 except for the lowermost separating plate 15 are each constituted by an outer member 14b and an inner member 14a. In this example, the inner tube 5' is of a truncated cone shape, and the outer diameters of the separating plates 14, i.e., the outer diameters of the outer members 14b, are decreased from the upper part to the lower part and coincide with the inner diameters of the inner tube at the parts where the plates are stopped. In the example of FIG. 5(A), in the respective sets of separating plates 14 the outer member is placed at the lower side and the inner member is placed at the upper side.

As described in the foregoing, when the plural sets of separating plates 14 penetrated by the dummy rod 2 are placed on the connecting part 3, during descending the dummy rod 2 and so on while proceeding with the fiber drawing, the outer members 14b are stopped on the inner wall surface of the inner tube 5' in the order from the uppermost separating plate 14, with the inner members 14a being prevented from moving downward in the state where they are placed on the outer member 14b of the respective sets, and thus the space inside the inner tube 5 is vertically separated by the respective sets of separating plates 14. While an example is shown in FIG. 5(A), where the plural sets of separating plates are respectively constituted by an outer member and an inner member except for the lowermost one, it is possible that only a part of the sets or all the plural sets of separating plates including the lowermost one are constituted by the outer members and the inner members. Not using the combination of the outer member and the inner member, the space may be separated by one separating plate. As shown in FIG. 5(B), when a taper where the diameter is reduced toward the upside, is provided on the outer circumference 14c of the outer member 14b, the contact area with the inner tube 5' can be reduced, and the possibility of damage to the inner tube 5' by the separating plate 14 can be reduced.

Figure 6:
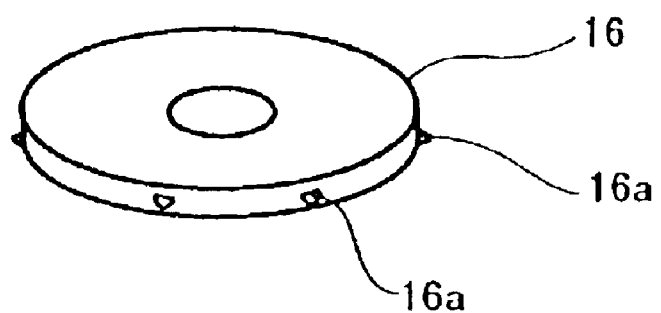
FIG. 6 is a perspective view showing another embodiment of the separating plate according to the invention.

As shown in FIG. 6, when protrusions 16a having a hemispherical shape toward the outside are provided at regular intervals on the outer circumference of the separating plate 16, the sliding friction coefficient of sliding on the inner wall surface of the inner tube can be reduced during descending the separating plate in the inner tube. Such protrusions can be provided on the outer circumference of the outer member not only for the case of one separating plate, but also for the cases of a combination of two plates as in FIGS. 4(A) and (B) and FIG. 5, so as to obtain a similar effect.

Figure 7A:
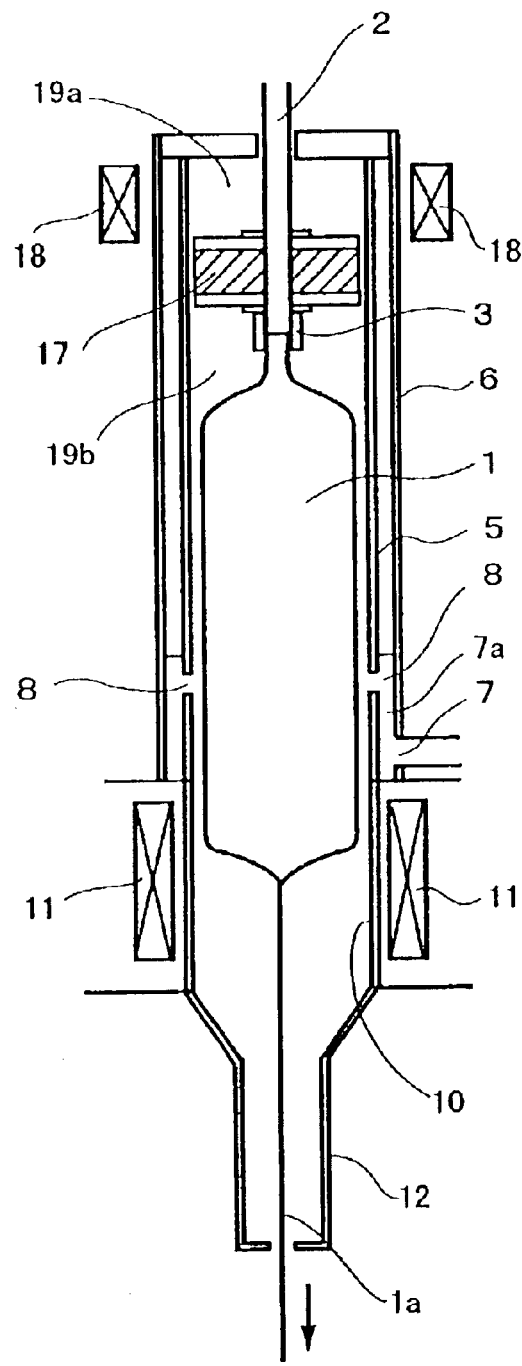
FIG. 7 is a vertical cross sectional view showing another embodiment of the furnace for drawing an optical fiber according to the invention, where (A) is a figure showing the state at the beginning of fiber drawing, and (B) is a figure showing the state near the completion of the fiber drawing.
Figure 7B:
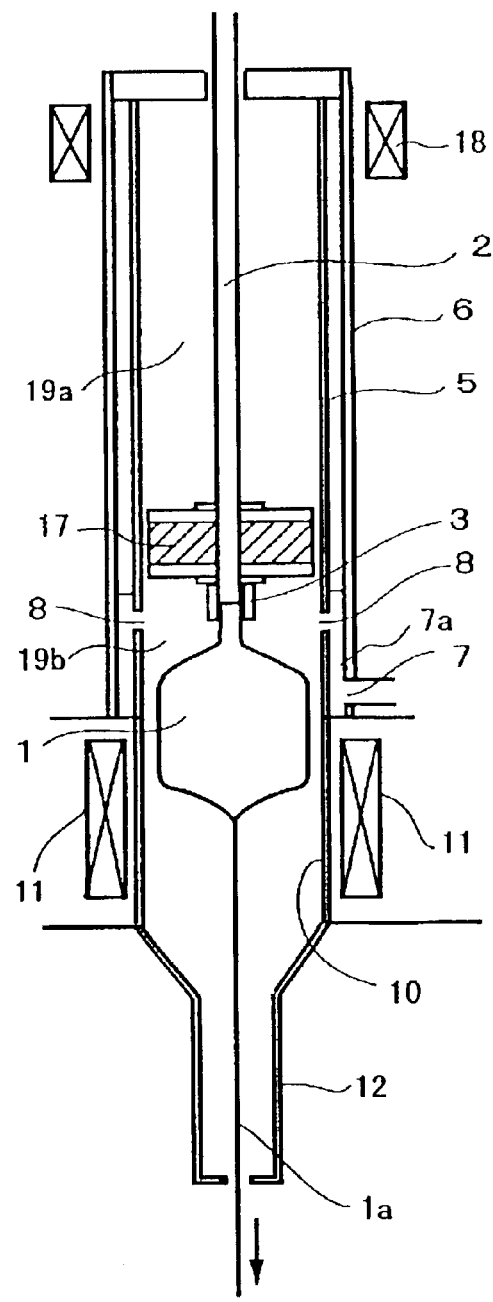
Figure 8:
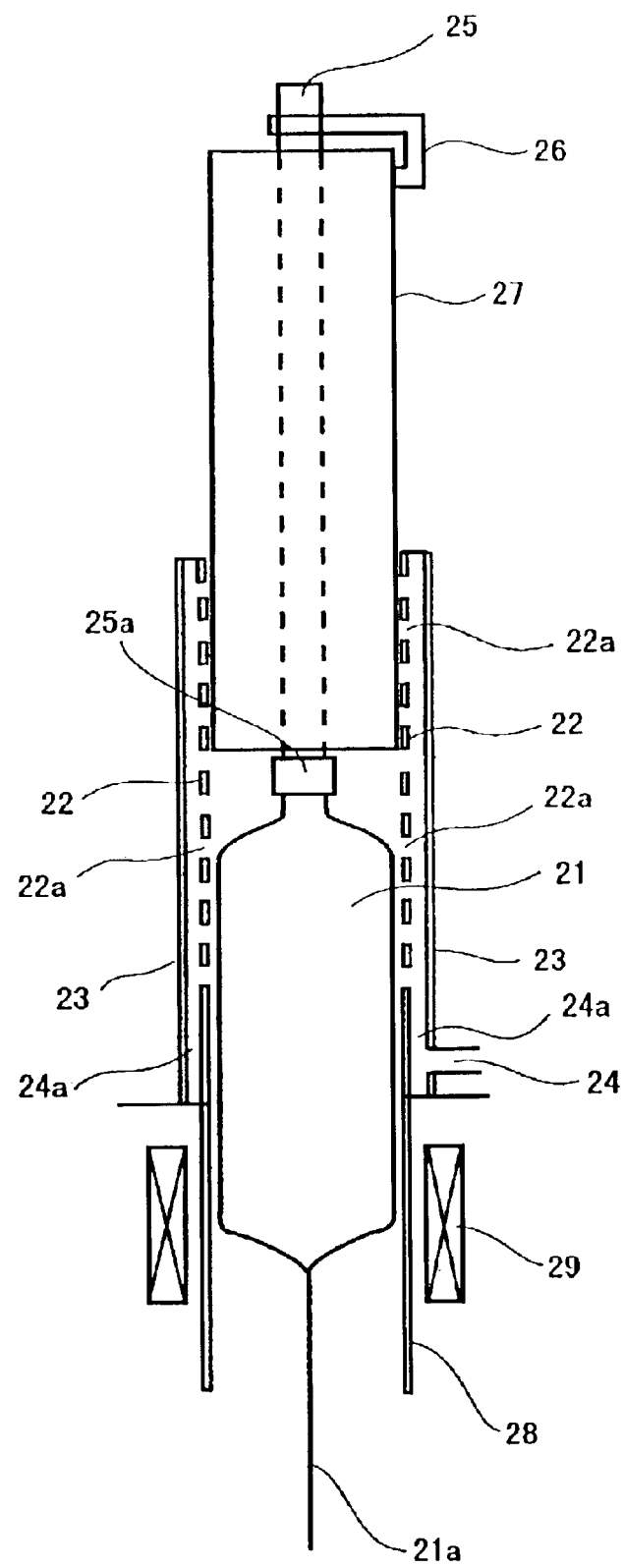
FIG. 8 is a vertical cross sectional view showing a main part of a furnace for drawing an optical fiber according to a prior art.
Figure 9:
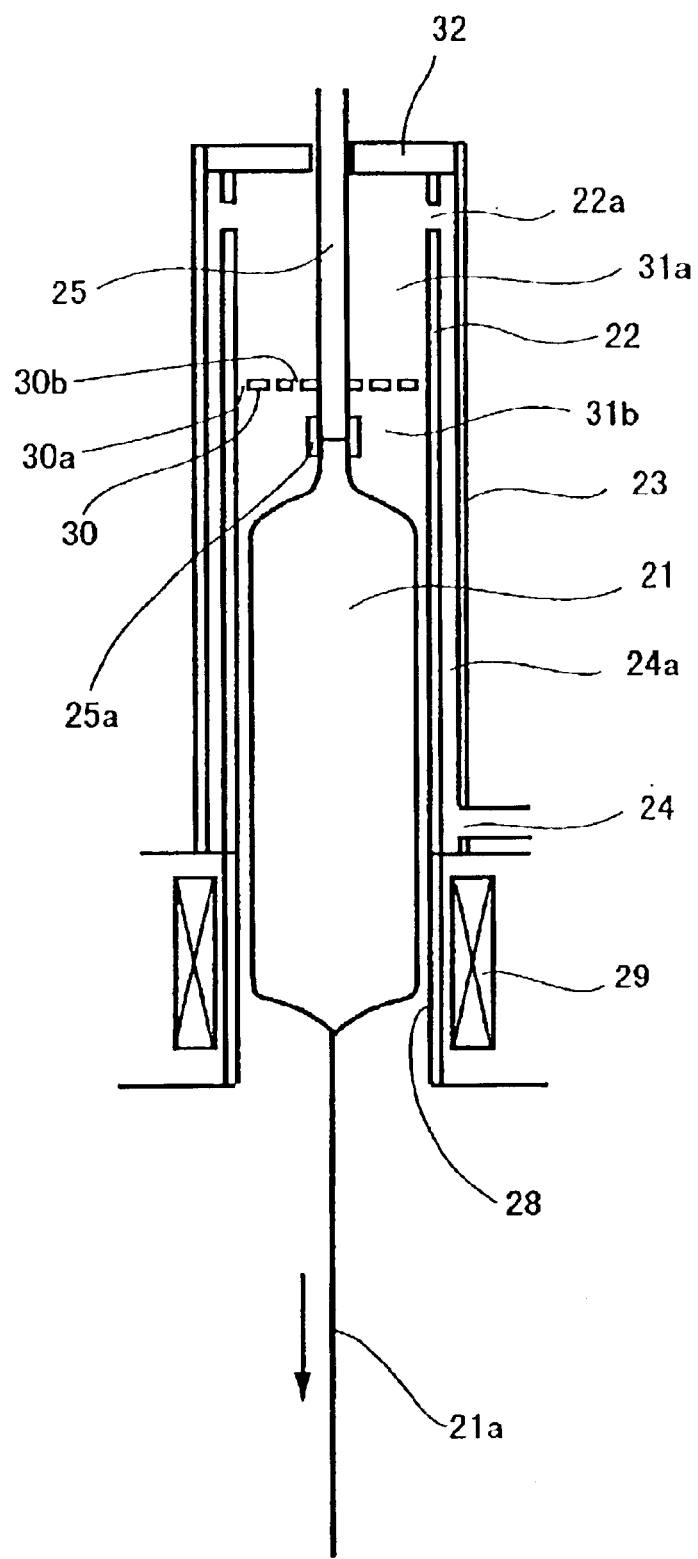
FIG. 9 is a vertical cross sectional view showing a main part of a furnace for drawing an optical fiber according to another prior art.
Figure 10:
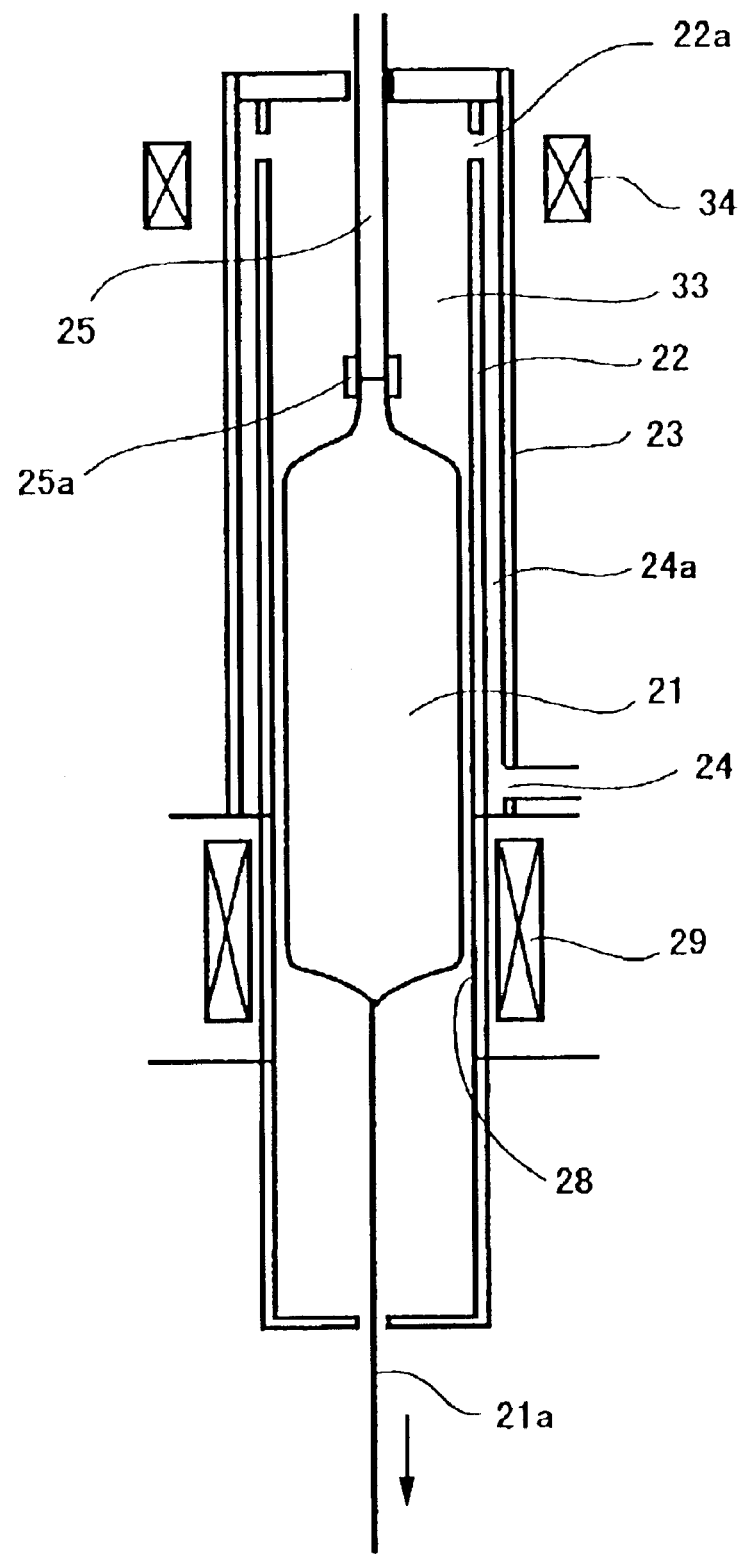
FIG. 10 is a vertical cross sectional view showing a main part of a furnace for drawing an optical fiber according to another prior art.

FIG. 7 shows cross sectional views showing an embodiment in which the separating plate comprises a heat insulating material, where (A) shows the state in the beginning of fiber drawing, and (B) shows the state near the completion of the fiber drawing. The same symbols as in FIG. 1 show the same components. Numeral 17 denotes a separating plate, 18 denotes an auxiliary heater, 19a denotes an upper space, and 19b denotes a lower space. The separating plate 17 comprising a heat insulating material can make the temperature near the lower end of the dummy rod at 400° C. or less owing to the heat insulating effect thereof. A heat insulating material formed of carbon felt can be used. The thickness of the heat insulating material is about 30 to 150 mm. There are cases where the upside and downside thereof are retained with quartz plates having a thickness of about 10 mm. By providing the separating plate comprising the heat insulating material, the temperature above the separating plate can be lowered to about 300 to 400° C. even when the temperature near the upper end of the preform is about 1,200° C. By increasing the thickness of the heat insulating material, the temperature above the separating plate can be further lowered. A separating plate comprising materials such as one obtained by compressing carbon powder, foamed ceramics, foamed quartz and the like, can be used provided that the heat insulating function equivalent to the heat insulating material can be realized.

Because the temperature of the lower part inside the upper space 19a can be lowered by fabricating the separating plate 17 with a heat insulating material, the convection of the inert gas retained in the upper space 19a, due to the temperature difference inside the upper space 19a, scarcely occurs. Therefore, it scarcely occurs that the convection of the inert gas in the upper space 19a influences the gas stream in the vicinity of the fiber drawing part of the preform.

When the auxiliary heater 18 is provided outside the upper end of the inner tube 6 to heat the vicinity of the upper end of the inner tube 6 to about 400° C., the vertical temperature difference inside the upper space 19a is further reduced, so as to further proceed with the temperature uniformity. Thus, the gas convection inside the upper space can be further suppressed by the temperature uniformity in the upper space 19a. In this case, since the temperature inside the upper space 19a is lowered by the separating plate, it is not necessary to provide a number of auxiliary heaters vertically. Only one auxiliary heater outside the upper part of the inner tube may sufficiently exhibit the effect.

In the furnace for drawing an optical fiber of this invention, because the separating plates 4 or 17 is provided around the dummy rod 2 or between the dummy rod 2 and the preform 1, and the gas blowing inlets 8 are provided on the wall of the inner tube under the moving range of the separating plate 4 and 17, the space between the separating plate 4 and 17 and the preform 1 is always constant even when the preform is shortened with proceeding the drawing from the preform, so that there is little upward stream from the gas blowing inlets 8, and thus it is considered that turbulence of the gas stream between the preform and the separating plate does not occur. While the inert gas partially enters into the upper space separated by the separating plate 4 and 17, the stream of the inert gas in the space does not influence the lower space under the separating plate 4 and 17 because the stream is small.

Therefore, the inert gas entering from the gas blowing inlets 8 scarcely flows toward the upper part of the preform, but flows downward to the casing 12 for downward extending a furnace body, and therefore the stream of the inert gas around the drawn optical fiber 1a is maintained to laminar flow conditions. Since the stream is substantially unchanged by the descent of the preform, the fluctuation in diameter of the optical fiber drawn from the lower end of the preform can be made small.

Optical fibers having a diameter of 125 $\mu$m were drawn from a preform having a diameter of 90 mm and a length of 1,500 mm in furnaces for drawing an optical fiber shown in FIG. 1, FIG. 2 and FIG. 7, and fluctuation in diameter of the optical fibers could be suppressed to ±0.1 $\mu$m or less in each case.

Industrial Applicability

The furnace and a method for drawing an optical fiber of the invention can be utilized for the operation of producing an optical fiber by drawing from a preform comprising glass, such as silica glass, as a main component.

What is claimed is:

1. A method for drawing an optical fiber comprising: arranging a preform supported by a dummy rod at an upper part of the preform inside a muffle tube and an inner tube connected to an end of the muffle tube in such a manner that said preform descends with said dummy rod, and melting said preform by heating to draw an optical fiber from said preform, such that while one partition or plural partitions of separating plates are arranged inside said inner tube to vertically separate a space inside said inner tube into plural parts, the vicinity of the lower end of said preform is melted while an inert gas flows into the inside of said inner tube and the muffle tube via a gas blowing inlet provided on a wall of said inner tube under said separating plate, so as to draw an optical fiber from a lower end of said preform, wherein said one partition or plural partitions descend with said preform during drawing of the optical fiber.

2. A method for drawing an optical fiber as claimed in claim 1, wherein while a vertical temperature difference in an upper space inside said inner tube is reduced by heating a vicinity of an upper end of said upper space inside said inner tube by an auxiliary heater, said vicinity of said lower end of said preform is heated and melted by a heater arranged outside said muffle tube, so as to draw an optical fiber from said lower end of said preform.

* * * * *